July 3, 1951    G. A. HUNTER    2,559,432
LIQUID DISPENSING APPARATUS
Filed Feb. 1, 1946    2 Sheets-Sheet 1
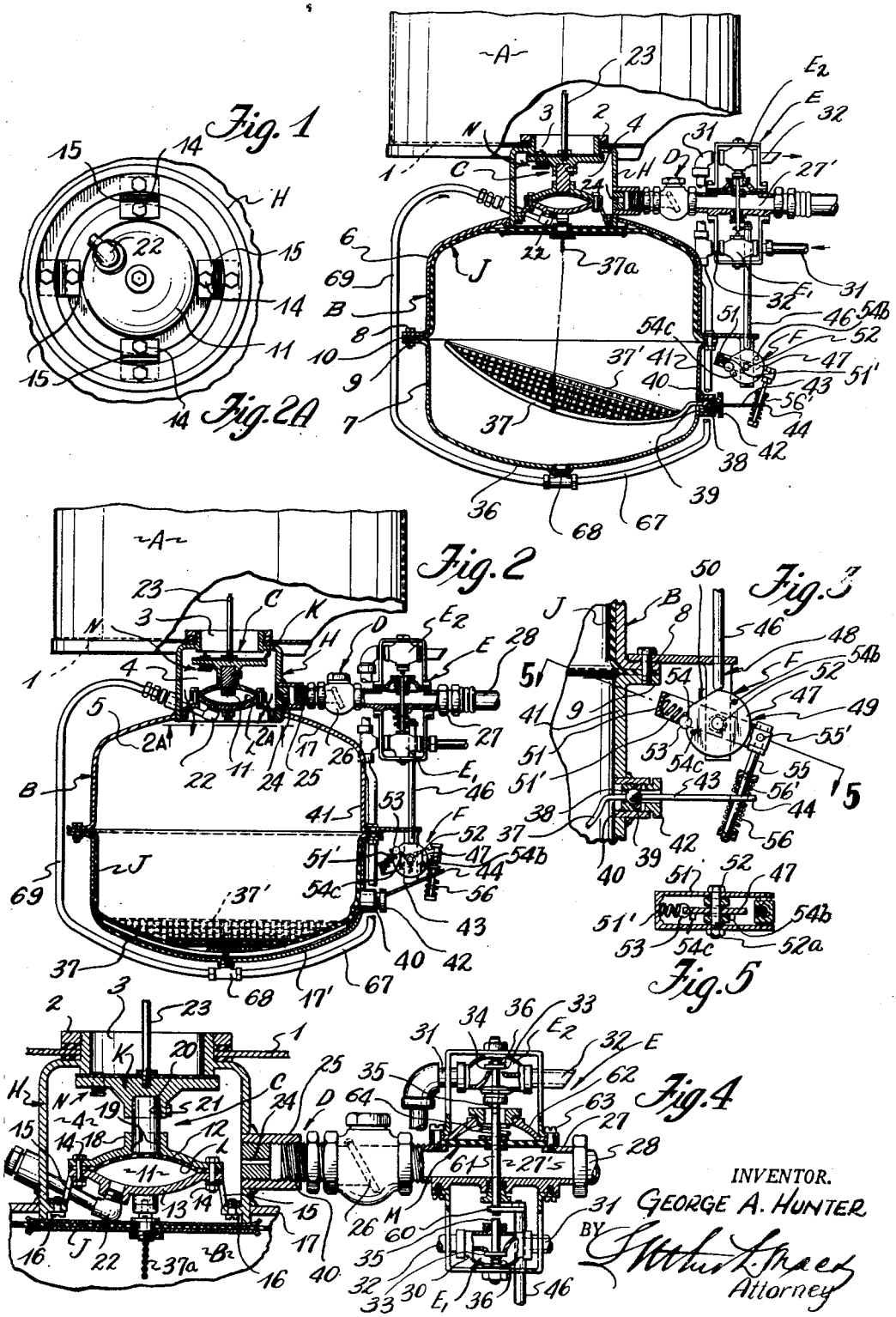
INVENTOR.
GEORGE A. HUNTER
BY
Attorney July 3, 1951 G. A. HUNTER 2,559,432
LIQUID DISPENSING APPARATUS
Filed Feb. 1, 1946 2 Sheets—Sheet 2
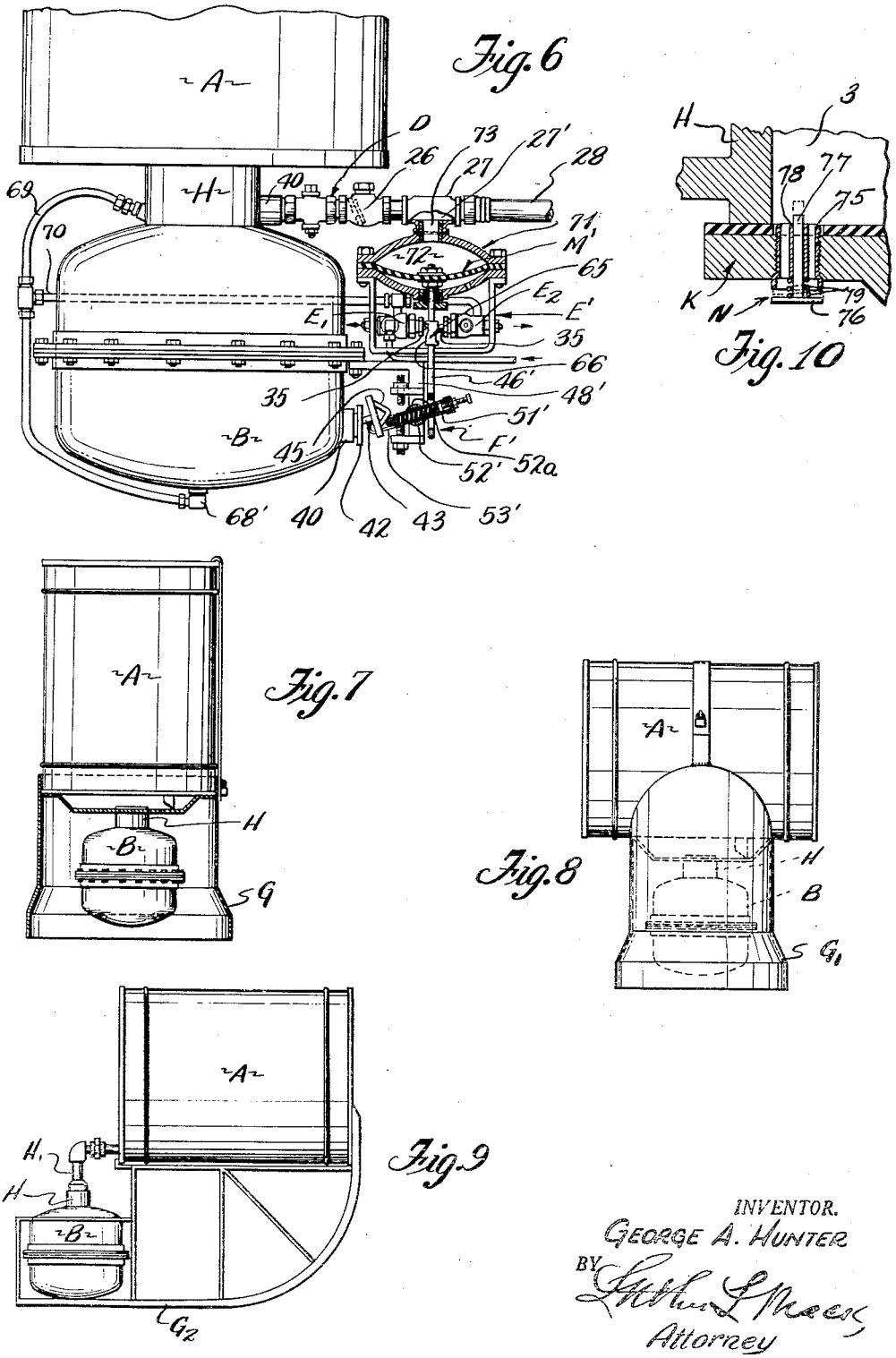
INVENTOR.
GEORGE A. HUNTER
BY
Attorney Patented July 3, 1951

2,559,432

UNITED STATES PATENT OFFICE 2,559,432

LIQUID DISPENSING APPARATUS

George A. Hunter, Los Angeles, Calif.

Application February 1, 1946, Serial No. 644,836

7 Claims. (Cl. 222—64)

In this invention, in general, I have provided an automatically operative dispensing apparatus for liquids of variable specific gravity or viscosity, whereby a liquid contained in a tank at atmospheric pressure may be fed under control and by gravity to a receptacle disposed at a lower elevation, and means associated with the tank and the receptacle for automatically regulating and effecting the dispensing of liquid from the receptacle under pressure through a conduit fitted with a valve which is opened for variable lengths of time as for instance the usual hose and nozzle connection used in servicing an automobile.

While my improved apparatus may be used for various purposes, I have particularly designed the same for the purpose of dispensing lubricants of different specific gravity and viscosity for application, for instance, to motor vehicles, and in connection therewith refer to patents of the United States numbered 1,969,404 and 2,118,381, granted to me on August 7th, 1934 and May 24th, 1938, respectively, and the present improvements are designed to reduce manual effort in the operation thereof to a minimum, economize in the cost of operation and to provide automatic operation as far as possible.

Although I will describe herein and have shown an apparatus especially adapted for applying a lubricant to mechanisms, it will be obvious that the same type of apparatus, with but minor modifications, if any, may be used with equal effect for other purposes.

An object of this invention is to provide a tank capable of holding a liquid such as a lubricant which, under appropriate control, may be fed to a receptacle positioned below and connected with said tank, means in said receptacle for collecting liquid from the tank, and means for applying a fluid such as air, gas, water or other elements to the contents of the receptacle and for dispensing said contents for use.

Broadly, I contemplate the provision of a liquid storage tank and a dispensing receptacle in controlled communication therewith arranged so that the contents of the tank may at times freely flow to the receptacle and at other times be prevented, together with automatically operable means for applying pressure to and for dispensing the contents of the receptacle.

Other and more detailed objects will appear as the description of my apparatus progresses.

I have shown a preferred embodiment of my invention in the accompanying drawings, in which:

Fig. 1 is an elevational view, partly in section, of my apparatus showing an empty dispensing receptacle;

Fig. 2 is a view similar to Fig. 1 showing the apparatus arranged as when the dispensing receptacle is filled;

Fig. 2a is a sectional plan on line 2A—2A of Fig. 2;

Fig. 3 is an enlarged fragmentary view of a part of the control mechanism as shown in Fig. 1;

Fig. 4 is an enlarged sectional view of the valve mechanism shown in Figs. 1 and 2;

Fig. 5 is a sectional view on line 5—5 of Fig. 3;

Fig. 6 is an external view of the apparatus, similar to Figs. 1 and 2, but showing a modified arrangement of the control mechanism and dispenser;

Figs. 7, 8 and 9 are elevational views of the apparatus showing different arrangements of the tank and receptacle; and Fig. 10 is a fragmentary enlarged sectional view of the valve between the material container and the dispensing receptacle, which shows an air vent associated with said valve.

Briefly described, my apparatus includes a tank A for holding a substantial quantity of a liquid to be dispensed, such as a lubricant, a dispensing receptacle B for receiving liquid from tank A for dispensation and application to a mechanism as by means of a suitable manually operable nozzle or "gun" (not shown herein), a valve mechanism C for controlling the flow of the contents of tank A to receptacle B, a dispenser D, a composite valve mechanism E, as in Figs. 1, 2 and 4, or E', as in Fig. 6, for regulating and relieving pressure with respect to the liquid in receptacle B, as may be required, and an automatically operable means F, or F' as in Fig. 6, for rendering the apparatus automatic in operation in response to varying conditions of use.

As shown in Figs. 7, 8 and 9, my apparatus may be mounted on a suitable base G, G₁ or G₂, respectively, with the tank A vertically or horizontally disposed, but in any case with receptacle B vertically disposed and suitably connected with tank. For instance, as in Figs. 1, 7 and 8 the tank and receptacle are directly connected by a cylindrical throat H while, as in Fig. 9, the throat is connected with the horizontal tank at an end by means of pipe fittings generally indicated at H₁. In all events, however, the mechanism shown in Figs. 1 and 2 are identical and operate in the same manner.

Now, referring to Figs. 1 and 2 particularly, it may be observed that throat H is detachably secured to bottom I of tank A as by means of a nut 2 and said throat has an outlet opening 3 of substantial area for permitting a free flow of the contents of the tank into and through the chamber 4 of the throat and thence into chamber 5 of receptacle B under certain conditions which will be hereinafter described. Receptacle B is formed of two mating shells 6 and 7 with flanges 8 and 9 which are adapted to be suitably secured together to afford leak-proof characteristics to the chamber 5, and a flexible diaphragm J has its marginal portion 10 held between said flanges. Said diaphragm is so formed that it may conform to the inner surfaces of members 6 and 7 as shown in Figs. 1 and 2, respectively, and is leak-proof and pressure resistant.

In chamber 4 (hereinafter referred to as a dispensing chamber) of throat H, I provide a disc valve K which is adapted to seat over and regulate the flow of liquid from tank A through outlet 3. Also, mounted in chamber 4 is a diaphragm L mounted in a chamber 11 formed between mating members 12 and 13 which are attached together at points 14 and are commonly supported on legs 15 attached at 16 to the wall 17 of member 6. Member 12 has a neck 18 which is bored at 19 to slidably receive a stem 20 which depend from and is fixed at 21 to the hub of valve K (see Fig. 4). Stem 20 is arranged to be engaged by diaphragm L when pressure—air or otherwise—is applied to chamber 11 below the diaphragm, as through a pressure connection 22 leading from chamber 11 to a source of pressure. Thus, when diaphragm L is dilated upwardly as shown in Fig. 4 valve K will be moved so as to close outlet 3 but as pressure in chamber 11 is relieved the liquid from tank A may flow into chamber 4 and thence to receptacle chamber 5 onto diaphragm J. Valve K may have an upwardly extended rod 23 attached thereto so that said valve may be operated on occasions from the interior of tank A for any purpose.

Dispensing chamber 4 has a restricted outlet 24 which by means of a fitting 25, a check valve 26 and one or more sections 27 of a pipe is adapted for communication with a dispensing or injection nozzle (not shown) usually through a flexible hose 28, whereby the dispensing of the liquid is controlled and effected.

From a description thus far it will be apparent that when valve K is open the contents of tank A will descend by gravity into chamber 4 and thence to that portion of chamber 5 which is above diaphragm J. As the volume and weight of the liquid increases the diaphragm J gradually sinks in chamber 5 to a position shown in Fig. 2, at which time the receptacle B as well as dispensing chamber 4 is filled with liquid. Therefore, in order to dispense liquid from chamber 5 it is necessary to apply pressure to the then lowered diaphragm for exhausting the liquid from chamber 4 through outlet 24, pipe 25, valve 26, pipe 27 and hose 28 to and from a usual dispensing nozzle. Check valve 26 permits free outflow of the liquid but prevents back pressure directed toward chamber 4.

The pressure control mechanism applicable to diaphragm J, as at E or E', in cooperation with the automatic control mechanism F, is designed to regulate the application of pressure to diaphragm J and the relief of pressure applicable thereto in the manner and by means of the devices hereinafter described.

It should be understood that diaphragm J is depressed from the position shown in Fig. 1 to that shown in Fig. 2 only by the weight of the liquid from tank A thereon.

One means for applying pressure to diaphragm J and also diaphragm L, consists in the provision of air valves and connections E and E' but, in lieu thereof water pressure and requisite valves and connections may be substituted to produce an equal effect. As shown, I provide an air inlet valve $E_1$ and an air exhaust valve $E_2$ which form elements of the composite unit E and are adapted, respectively, to admit compressed air from a source (not shown) to chamber 5 below diaphragm J and chamber 11 below diaphragm L, and at times to vent the air from said chambers.

Valves $E_1$ and $E_2$ may be of the same type, such as are known as "whistle valves," and each valve includes a body 30 with an inlet 31, an outlet 32, a valve 33, a valve seat 34, a stem 35 and a spring 36 tending to hold valve 34 on its seat and therefore closed. Said valves $E_1$ and $E_2$ are so arranged in the apparatus that when one is open the other is closed. Thus, when air is being admitted to chamber 5 of the receptacle B below diaphragm J, valve $E_1$ will be open and exhaust valve $E_2$ will be closed, and vice versa.

In order to effect automatic operation of the mechanism, I provide the unit F which includes a bar or bars 37 which preferably conform to the bottom 17' of receptacle B and may have a basket-like receiver 37' on which the diaphragm J may rest when said diaphragm is loaded with liquid. Unit F also includes means for automatically controlling the operation of air or water inlet and exhaust valves $E_1$ and $E_2$, respectively, in accordance with the operation of bar 37, as shown in Figs. 1, 2 and 3. For example, bar 37 is hinged at 38 in a member 39 (Fig. 3) which is threadedly adjustable in a nipple 40 fixed to the wall 41 and is held in operative position by a nut 42. Bar 37 may have an extension 43 with a loop 44 (Fig. 1, 2 and 3) or a cam-like end 45 (Fig. 6) arranged for adjustable connection with a rod 46 and accessory devices whereby the air inlet valve $E_1$ and air outlet $E_2$ are capable of automatic operation in response to the position of basket 37'.

As shown, particularly in Fig. 3, I provide a cam 47 which is pivotally mounted on a bracket 48 and engages an end of rod 46. Said cam has a concentric dwell 49 and a relatively short flat dwell 50, which dwells are engageable with rod at certain times, depending upon the position of bar 37 in receptacle B. Rod 46 rests upon dwell 49 when exhaust valve $E_2$ is open and inlet valve $E_1$ is shut, while rod 46 rests on dwell 50 when the exhaust valve $E_2$ is closed and the inlet valve $E_1$ is open. Thus, as shown in Fig. 1, when bar 37 is disposed in raised position exhaust valve $E_2$ is open and inlet valve $E_1$ is closed because it is necessary in this position to allow air to escape from under diaphragms L and J so that valve K will be opened by the weight of lubricant in tank A and the parts brought to the position shown in Fig. 2 when the position of valves $E_1$ and $E_2$ will be automatically reversed. As shown in Fig. 2, when the exhaust valve is closed the inlet valve $E_1$ is open.

The mechanism F includes a frame 51 which has a bolt or pintle 52 pivotally mounting it on bracket 48 and on which cam 47 and frame 51 are pivotally mounted, as shown in Figs. 1, 2 and 3. Frame 51 carries a compression spring 51' with a spherical member 53 attached to or held on its inner extremity and adapted to engage a notch 54 in cam 47, so as to hold said cam in position with either of the dwells 49 or 50 engaging rod 46 when the cam is moved in one or the opposite direction over the center position by bar 37 (see Fig. 3). Stops 54b and 54c project from cam 47 and one or the other engages the edge of bracket 48 to limit the movement of the cam to the positions shown in Fig. 1 and Fig. 3. The opposite end of frame 51 from spring 51' carries a rod 55 which is pivoted at 55' to the frame and carries a pair of springs 56 and 56' between which extension 43 of bar 37 is positioned. Thus, as bar 37 is actuated, the cam 47 will be correspondingly rotated on its axis 52 for engaging one of the dwells 49 and 50 with the end of rod 46, and will thereby occasion the opening and closing of valves $E_1$ and $E_2$. It is obvious that springs 56 and 56' serve to cushion the connection between bar 37 and frame 51, and, because ball 53 is always on one or the other side of dead center position, the cam 47 will be held by the tension of spring 51' at either extreme of movement so as to maintain valves $E_1$ and $E_2$ in operative positions. Thus, the opening and closing of air inlet and exhaust valves $E_1$ and $E_2$ are automatically effected by the raising and lowering of bar 37. The lowering of said bar is occasioned by the accumulated weight of the material to be dispensed, while the raising of said bar is caused by the application of pressure to receptacle B at a point below the basket-like receiver 37'.

Springs 36 of both valves $E_1$ and $E_2$ tend to close said valves, but, as shown in Fig. 4, the rod 46 is provided with an arm 60 which overlies stem 35 of valve $E_1$ and may be attached to a rod 61 which abuts stem 35 of valve $E_2$, so that as rod 46 is raised or lowered by cam 47 the inlet and exhaust valves $E_1$ and $E_2$ will be correspondingly operated. Rod 61 extends through chamber 27' of fitting 27 and is fixed to a diaphragm M which is held between said fitting 27 and a member 62, as at 63. A spring 64 urges the diaphragm M downwardly, as shown in Fig. 4, while excess pressure in chamber 27' tends to urge said diaphragm upwardly against the tension of spring 64. Thus, rod 61, under the influence of rod 46, cam 47 and bar 37, effects the opening and closing of valves $E_1$ and $E_2$ in accordance with the requirements of use.

As shown in Fig. 6 I may provide a modified form of mechanism for regulating the admission and exhaust of air which includes a cam 45 fixed to extension 43 of bar 37 and is engageable with a member 53' and is tensioned by a spring 52' which is carried by a frame or tube 51' and is pivotally mounted, as at 52a, on a bracket 48'. In this form of apparatus valves $E_1$ and $E_2$ are arranged tandem-like with their valve stems 35 axially opposed and rod 46' has a dual cam 65 fixed thereto, which has oppositely inclined surfaces 66 adapted for engagement with stems 35, 35 of valves $E_1$ and $E_2$ so that as rod 46' is raised or lowered the valves $E_1$ and $E_2$ will be opened and closed for regulating admission of air to receptacle B at a point below diaphragm J and to chamber 11, and for exhausting air therefrom, respectively, during the operation of the dispenser.

As shown in Figs. 1 and 2, chamber 5 of receptacle B is connected with air valves $E_1$ and $E_2$ by means of a pipe 67 and a fitting 68 which leads from the outlet of valve $E_1$ and the inlet of valve $E_2$, and chamber 11 is connected with fitting 68 and inlet 22 to chamber 11 by a pipe 69. However, as shown in Fig. 6, pipe 67 may be omitted and in lieu thereof a pipe 70 may be connected between valves $E_1$ and $E_2$ and pipe 69 and will serve the same purpose as pipe 67. Also diaphragm $M_1$ may be separately mounted in a unit 71 and connected with rod 46' while the chamber 72 thereof is in communication with the passage 27' in dispensing fitting 27.

It may be observed that, as illustrated in Fig. 1, the bar 37 which carries basket receiver 37' is connected with diaphragm J at a central point as by means of a flexible chain 37a so that as diaphragm J is extended upwardly toward its maximum extreme of dilation by reason of air pressure in receptacle therebelow, said chain (or a substitute therefor) will stretch to its limit at a point before the diaphragm is completely dilated and thereby raise bar 37 and receiver 37' to the position shown in Fig. 1.

It must be remembered that when receiver 37' is lowered, as in Fig. 2, the diaphragm J rests thereupon because of the weight of the dispensable material carried by the diaphragm and at such time valve $E_1$ is open while valve $E_2$ is closed. Reversely, when diaphragm J is uppermost, as in Fig. 1, valve $E_1$ is closed while valve $E_2$ is open, the position shown being that just after the opening of valve $E_2$ and before the diaphragm J has begun to fall back, and air under pressure fills receptacle B but rapidly exhausts through valve $E_2$ and material from tank A accumulates on top of the diaphragm to lower the receiver 37' to an extent which will occasion a reversal of valves $E_1$ and $E_2$.

As long as rod 46 rests on the concentric dwell 49 of cam 47 (Fig. 3) exhaust valve $E_2$ will be open and valve $E_1$ will be closed, but when rod 46 rests upon the flat dwell 50, the valves will be reversed. Naturally, as receiver 37' descends in receptacle B air is exhausted therefrom through fixture 68, pipe 67 and valve $E_2$. Also, as receiver is raised air (or water) under pressure is admitted to receptacle B below diaphragm J through valve $E_1$, and the dispensable material above the diaphragm J is expelled from chambers 4 and 5 through orifice 24, check valve 26, chamber 27' and hose 28 to and thence from a conventional nozzle.

When air flows to receptacle B while valve $E_1$ is open a sufficient pressure is created in pipe 69 for application to diaphragm L in chamber 11 to effect the closing of valve K in order that when the dispensing nozzle is opened the dispensable material may be expelled through orifice 24 only, instead of back into tank A. All dispensed material passes through check valve 26 which prevents back pressure in the passage 27' and hose 28 which would tend to counteract the pressure in chambers 4 and 5 under certain conditions. When dispensing lubricant through the nozzle, the pressure on diaphragm M is reduced, thus allowing the exhaust valve $E_2$ to close, while when the nozzle is closed the pressure in the passage 27' will automatically dilate diaphragm M and open the exhaust valve, and enable the inlet valve to be closed by its spring 36. When air is exhausted from receptacle B below diaphragm J and from pipe 69 and chamber 11, valve K opens and material flows into chamber 4 to replace the expelled lubricant.

In the event that an operator should completely dispense the contents of tank A and receptacle B without closing the dispensing nozzle from the time the chamber 4 is full and until it is empty, such conditions will be automatically cared for, as follows: when diaphragm J approaches its uppermost position, the chain 37a begins to lift bar 37—whereat the diaphragm will be about two inches below its uppermost position—thereby cam 47 is turned so that dwell 49 will be moved under and raise rod 46 and rod 61, opens exhaust valve E₁ and shuts off air pressure valve E₁. Such operation allows all air in receptacle below diaphragm J to exhaust and when tank A has been refilled from storage allows a free flow of the contents of tank A to chamber 4 so that receptacle B may be refilled. When the receptacle B is completely refilled arm or bar 37 then moves cam 47 so that dwell 50 will be under rod 46, thereby closing valve E₂ and opening valve E₁.

The foregoing description has been made with reference to the form of apparatus shown in Figs. 1, 2, 3 and 4, but it will be apparent that the form shown in Fig. 6, though of modified structure, operates in the same manner. It is recognized, particularly, that the automatic air control means F and F′, though of different form, include, broadly, a means interposed between the receiver 37′, the valves E₁ and E₂ and the diaphragm M which, in each form and to a like extent, perform identical results.

The application of pressure to the liquid contained in receptacle above the diaphragm J is automatically controlled by the units F or F′ in order to meet the demands of continued use without manual attention except as required for maintaining a supply of dispensable liquid in tank A. For instance, as shown in Fig. 3, the rotative movements of cam 47 and frame 51 are effected by the swing of receiver 37′ so that the swing of bar 37 moves cam 47 and frame 51 together for positioning dwells 49 or 50 under rod 46 and upon further movement of said receiver, upwardly or downwardly, will permit a further movement of the frame relative to the cam until the tensioned detent 53 is moved from one to the other side of dead center position and thus serves to prevent retractive movement of cam 47. Similar conditions obtain in the unit F′ except that the cam 45 is fixed to receive 37′ (or bar 37) and moves over detent 53′ carried on frame 51′.

Referring to Fig. 10, it is noted that, I have provided in association with valve K an auxiliary valve generally designated as N, which includes a valve mounting 75 attached to the disc valve K and carrying at its lower extremity a disc valve 76 having stem 77, which is slidable in a portion 78 of the mounting 75, and is held in open position as by means of a compression spring 79. In the operation of the dispenser it is possible that the tank A may be allowed through carelessness to become empty so that air enters chamber 4. The purpose of the valve assembly N is to provide a vent for any air trapped in dispensing chamber 4 into container A until the lubricant in said chamber 4 closes valve N and then escapes through outlet 24 when required.

An important feature of my present invention resides in the provision of a moisture free apparatus. The diaphragm J is highly flexible and conformable to the compartments B on opposite sides thereof and is at the same time impervious to the pasage of air or a liquid therethrough. It is well known that where compressed air is employed under high pressure moisture is likely to be condensed when the pressure and therefore temperature of the air is lowered. Because of the fact that the air or other fluid under pressure is applied to the lower side of diaphragm J, the pressure fluid and any moisture condensed therefrom has no contact whatever with the dispensable material and there is therefore no possibility of moisture entering the dispensing chamber 4.

It may be understood that when a unit is installed for use the relative positions of the component units are immaterial, for the reason that when said units are properly connected the weight of the material fed to chamber 4 and receptacle B and the application of pressure to the diaphragm J, while the dispensing nozzle is either open or closed, will effectuate the automatically operable elements of the dispenser. Although I have not shown in the drawings a dispensing nozzle in connection with hose 28, I refer to my prior Patents Nos. 1,969,404 and 2,118,381 in which a suitable nozzle of conventional form is shown.

I have, therefore, provided a high pressure lubricant dispenser which includes a container for liquid of variable specific gravity, a dispensing chamber for the liquid having controlled communication with said container, a receptacle including a diaphragm for receiving quantities of liquid at times from said chamber, and automatically operable devices connected with a dispensing means for applying pressure to the diaphragm for regulating the supply of liquid to and its expulsion from the dispensing chamber in accordance with demands of use.

I claim:

1. Apparatus for delivering fluid under pressure, comprising; a container having an outlet, an outlet passage in controlled communication with said container, a receptacle mounted at a lower level than said container and in constant communication with said outlet passage, a diaphragm in and secured by its edge to said receptacle intermediate the length thereof and distendable to sometimes conform to the contour of the receptacle to one side of the diaphragm, and sometimes to the contour of the receptacle to the other side of the diaphragm, for receiving liquid flowing by gravity from said container and movable in one direction by the weight of liquid acting thereupon, and means for applying fluid pressure to the side of the diaphragm opposite to that in contact with the liquid for expelling the contained liquid through said outlet passage for use as the diaphragm is moved by fluid pressure in a direction opposite to that caused by the weight of the liquid.

2. Apparatus for delivering fluid under pressure comprising: a container for liquid; a receptacle mounted at a lower level than liquid in said container and in communication with said receptacle; a distendable member arranged in said receptacle and adapted when distended to substantially completely occupy the space in said container available to receive liquid; a valve controlling the flow of liquid from the container into the receptacle; a first conduit for liquid expelled from said container; a second conduit connected to a source of pressure fluid and arranged to admit said pressure fluid to the side of the distendable member opposite to that contacted by the liquid to be dispensed; and manually operated valve means effective to admit pressure fluid to distend the distendable member and to close the valve controlling the flow of liquid from the container to the receptacle to effect expulsion of the liquid from the receptacle and to put said second conduit into communication with the atmosphere to open the valve controlling the flow of liquid from the container to enable fluid therefrom to enter the receptacle and return the distendable member to initial condition.

3. Apparatus as characterized in claim 1 including inlet and exhaust fluid pressure valves, means operatively connecting said valves with the diaphragm for opening and closing said valves alternately as the diaphragm is moved in the receptacle; and means effective to control said exhaust valve in accordance with the pressure of the liquid in the outlet passage.

4. Apparatus as characterized in claim 1 including inlet and exhaust fluid pressure valves, means operatively connecting said valves with the diaphragm for opening and closing said valves in opposite directions as the diaphragm reaches its limit of movement in one direction or the other and a control valve in the outlet passage for regulating the flow of liquid from the container by connection with said inlet and exhaust valves, so arranged that when the diaphragm is moved for expelling liquid from the dispensing outlet said control valve will be closed.

5. Apparatus of the character described comprising: a receptacle for the material to be dispensed, a diaphragm therein, onto which the material is adapted to be fed by gravity and by which the material is adapted to be expelled, a receiver pivotally mounted on the receptacle under the diaphragm and movable in one direction in response to the weight of the material on the diaphragm and in opposite direction in response to fluid pressure applied to the side of the diaphragm remote from the material receiving side, and valve means arranged externally of the container and receptacle and controlled by said receiver for applying fluid pressure to the flexible diaphragm when liquid is being expelled and for relieving the fluid pressure when the receptacle is being filled.

6. A dispenser as defined in claim 5 and in addition including: valve means for controlling the supply of fluid to the upper side of said diaphragm, pressure fluid operated means controlling said valve and means for operatively connecting said valve operating means with said valve means controlled by said receiver.

7. A dispenser as defined in claim 5 and in addition including: valve means for controlling the supply of fluid to the upper side of said diaphragm; pressure fluid operated means controlling said valve; and means for operatively connecting said material supply valve with said fluid inlet and exhaust valves, and flexible means connecting the diaphragm with the diaphragm operated receiver for actuating the receiver when the diaphragm approaches its uppermost position in the receptacle.

GEORGE A. HUNTER.

REFERENCES CITED

The following references are of record in the file of this patent:

UNITED STATES PATENTS

| Number | Name | Date |
|---|---|---|
| 40,504 | Sheffield | Nov. 3, 1863 |
| 588,632 | Buckingham | Aug. 24, 1897 |
| 1,435,237 | Humphrey | Nov. 14, 1922 |
| 1,473,475 | Eklund | Nov. 6, 1923 |
| 2,090,733 | Piquerez | Aug. 24, 1937 |
| 2,116,296 | Zachariassen et al. | Nov. 3, 1938 |
| 2,269,857 | Nielsen | Jan. 13, 1942 |